United States Patent
Bovio et al.

[11] Patent Number: 5,918,957
[45] Date of Patent: Jul. 6, 1999

[54] PIVOTING DOOR SYSTEM FOR A PORTABLE COMPUTER

[75] Inventors: Michele Bovio, Boston, Mass.; Jitender Kanjiram, Nashua, N.H.

[73] Assignee: Digital Equipment Corporation, Maynard, Mass.

[21] Appl. No.: 09/148,235

[22] Filed: Sep. 4, 1998

[51] Int. Cl.⁶ .................................................. A47B 81/06
[52] U.S. Cl. .................................... 312/223.2; 312/351.6; 361/380
[58] Field of Search .................................. 361/680, 681, 361/393, 752; 312/223.2, 351.6; 248/917, 922, 923

[56] References Cited

U.S. PATENT DOCUMENTS

| | | | |
|---|---|---|---|
| 4,951,241 | 8/1990 | Hosoi et al. | 361/681 |
| 5,196,993 | 3/1993 | Herron et al. | 248/923 |
| 5,200,883 | 4/1993 | Kobayashi | 361/683 |
| 5,594,617 | 1/1997 | Foster et al. | 361/683 |
| 5,646,818 | 7/1997 | Hahn | 248/917 |

*Primary Examiner*—Peter M. Cuomo
*Assistant Examiner*—Gerald A. Anderson
*Attorney, Agent, or Firm*—Hamilton, Brook, Smith & Reynolds, P.C.

[57] ABSTRACT

A pivoting door system for a housing of a portable computer includes a first housing hinge member extending downwardly from the housing below the bottom surface of the housing. A door for covering a region at the rear end of the housing is pivotably secured to the first housing hinge member about a hinge axis located below the bottom surface of the housing. The door is able to pivot downwardly to a position against the housing where the door is at an acute angle relative to the bottom surface of the housing to elevate the rear end of the housing. The weight of the housing and computer locks the door in this position.

20 Claims, 5 Drawing Sheets

PIVOTING DOOR SYSTEM FOR A PORTABLE COMPUTER

BACKGROUND

The keyboard for a portable computer such as a notebook computer is typically located on the upper surface of the base unit of the computer. In most cases, the upper surface of the base unit is flat, resulting in a keyboard that is horizontally oriented. For many users, a horizontally oriented keyboard does not present a comfortable typing position. Generally, most users prefer a keyboard which is tilted so that the rear of the keyboard is higher than the front. As a result, most portable computers provide some kind of legs at the rear of the computer which a user can manipulate to tilt the computer at an angle to make typing on the keyboard more comfortable.

SUMMARY OF THE INVENTION

The present invention provides a pivoting door system for a housing of a portable computer which is capable of tilting the portable computer at a comfortable typing angle without adding additional structure. The pivoting door system includes a first housing hinge member extending downwardly from the housing below the bottom surface of the housing. A door for covering a region at the rear end of the housing is pivotably secured to the first housing hinge member about a hinge axis located below the bottom surface of the housing. The door is capable of being pivoted downwardly to a position against the housing where the door is at an acute angle relative to the bottom surface of the housing to elevate the rear end of the housing. The weight of the housing and computer locks the door in this position.

In preferred embodiments, the door covers a series of ports within a port bay recessed at the rear end of the housing. The first housing hinge member is pivotably secured to a first end of the door with a first metallic pin which is spring loaded with a spring positioned within the first end of the door. The first housing hinge member includes an opening for providing access to the spring loaded pin for removing the pin. A second housing hinge member extends downwardly from the housing below the bottom surface of the housing and is spaced apart from the first housing hinge member. A second metallic pin pivotably secures a second end of the door to the second housing hinge member. A housing protrusion extends from the rear end of the housing and is capable of engaging a recess in the door for removably securing the door in a closed position. An exterior door protrusion extends from an exterior surface of the door and is capable of engaging with the housing protrusion for hindering rotation of the door towards the closed position when the door is in position to elevate the rear end of the housing. An interior door protrusion extends from an interior surface of the door and is capable of engaging an opening in the rear end of the housing for further removably securing the door in a closed position.

The present invention pivoting door system provides a single structure that serves as a port door for covering ports in a recessed port bay as well as a foot for elevating the rear end of the computer to tilt the keyboard at a comfortable typing angle. In the prior art, these two functions are commonly accomplished with two separate structures.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
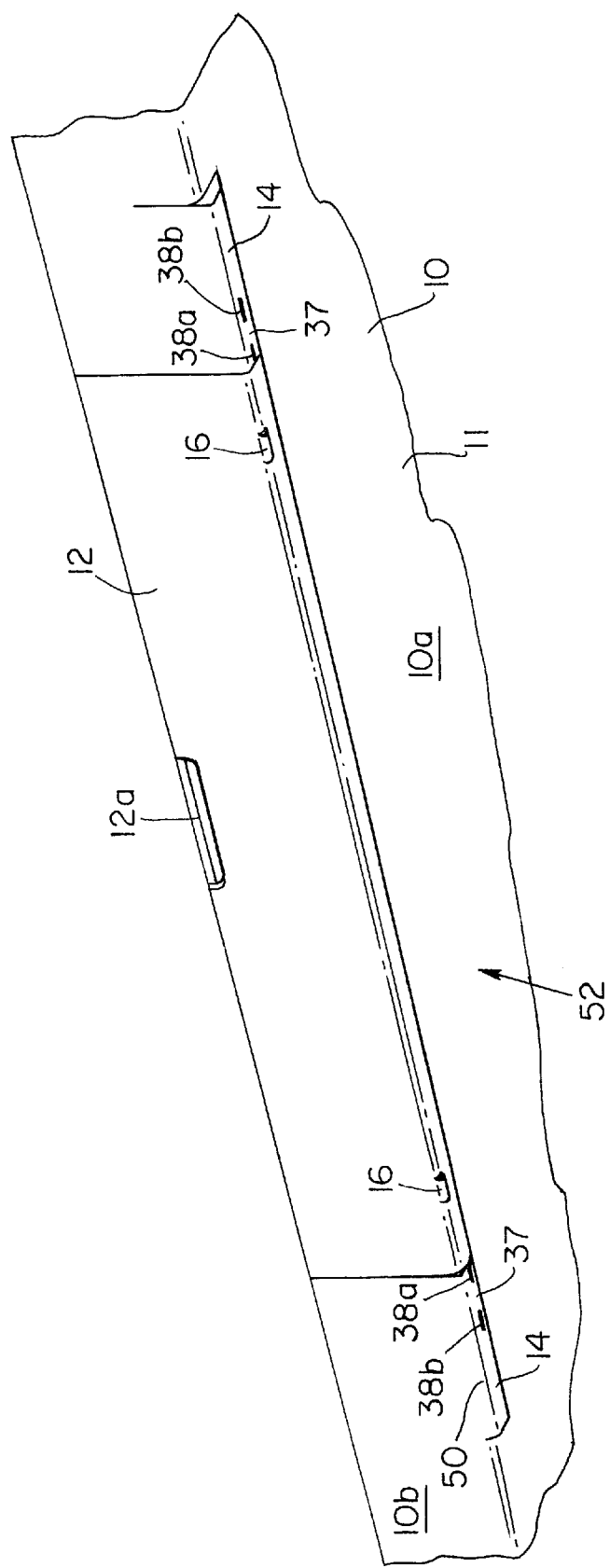
FIG. 1 is an enlarged rear perspective view of a notebook computer showing the port door of the present invention pivoting door system in the closed position.
Figure 2:
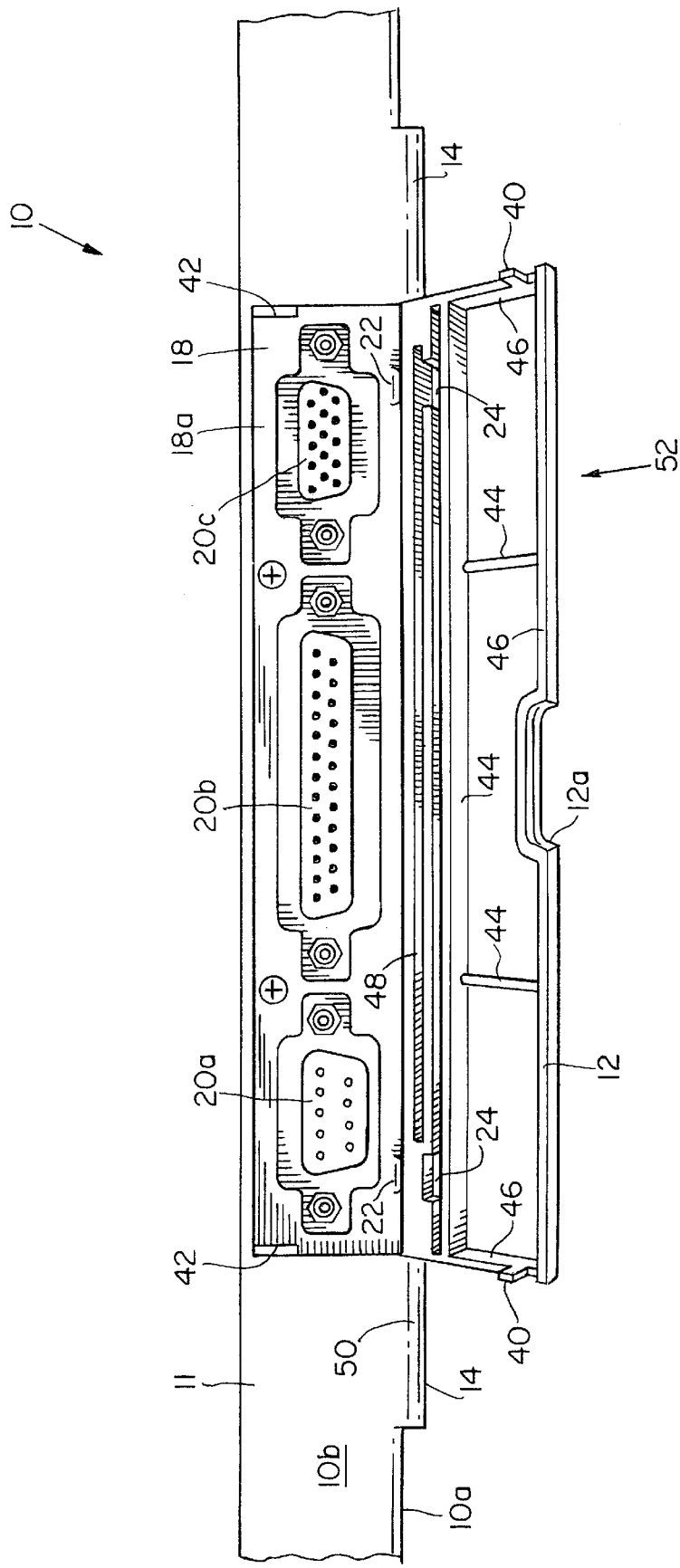
FIG. 2 is an enlarged rear view of the notebook computer of FIG. 1 showing the port door in an open position thereby providing access to a series of ports within a recessed port bay region.

Referring to FIGS. 1 and 2, notebook computer 10 has a plastic base unit housing 11 with a pivoting door system 52. The pivoting door system 52 includes a plastic port door 12 approximately centered on the rear wall 10b of housing 11 for covering a port bay region 18. Port bay 18 is recessed within rear wall 10b and includes a series of ports 20a, 20b and 20c. Cables can be coupled to ports 20a–20c for connecting computer 10 to exterior devices such as a printer, monitor or modem, etc. When covering port bay 18, port door 12 is recessed within port bay 18 such that the exterior surface of port door 12 is flush with rear wall 10b of base unit housing 11.

Port door 12 is pivotably secured between two hinge feet 14 which extend downwardly from the bottom surface 10a of the base unit housing 11. Hinge feet 14 serve as hinge mounts for port door 12 as well as feet for computer 10 when port door 12 is in the closed position. Port door 12 swings open downwardly and includes a notch 12a at the upper edge of port door 12 for allowing the tip of a finger or thumb to pull port door 12 open. The inner surface of port door 12 includes a series of ribs 44 and raised side edges 46 which strengthen and stiffen port door 12. The bottom edge of port door 12 has a thickened hinge portion 48 extending along the hinge axis or pivot line 50 of port door 12 for strengthening the hinge area. The inner surface of hinge portion 48 includes two notches 24 located at opposite ends of port door 12. Notches 24 engage two port bay protrusions 22 extending outwardly from the rear wall 18a of port bay 18 near the bottom of port bay 18 when port door 12 is in the closed position to hold port door 12 closed. Two interior port door tabs or protrusions 40 extend from opposite side edges 46 of port door 12 near the top of port door 12. Tabs 40 engage two rectangular holes or openings 42 in the rear wall 18a of port bay 18 for further holding port door 12 in the closed position.

Figure 3:
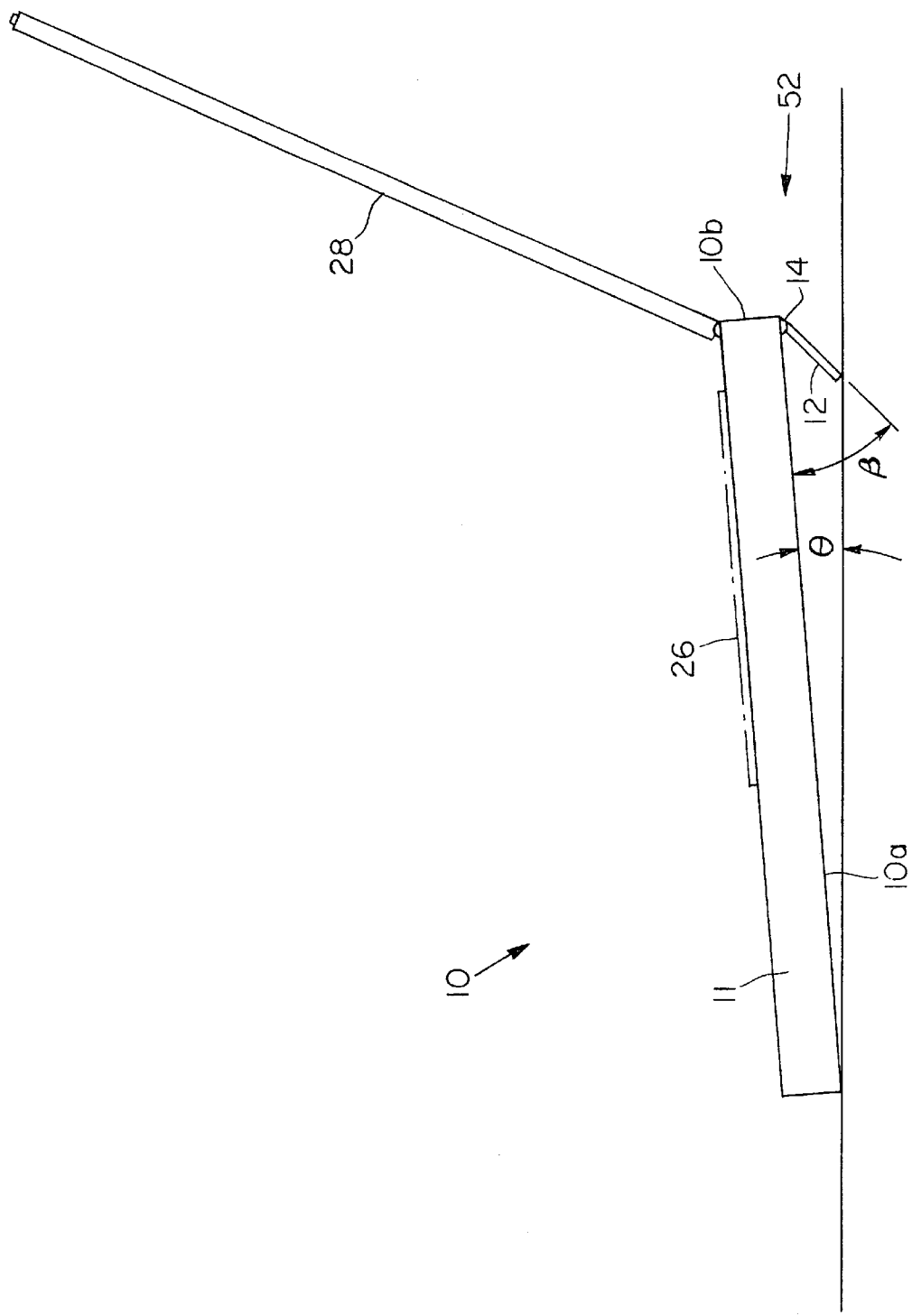
FIG. 3 is a side view of the notebook computer of FIG. 1 with the port door positioned to tilt the computer at a comfortable typing angle.
Figure 4:
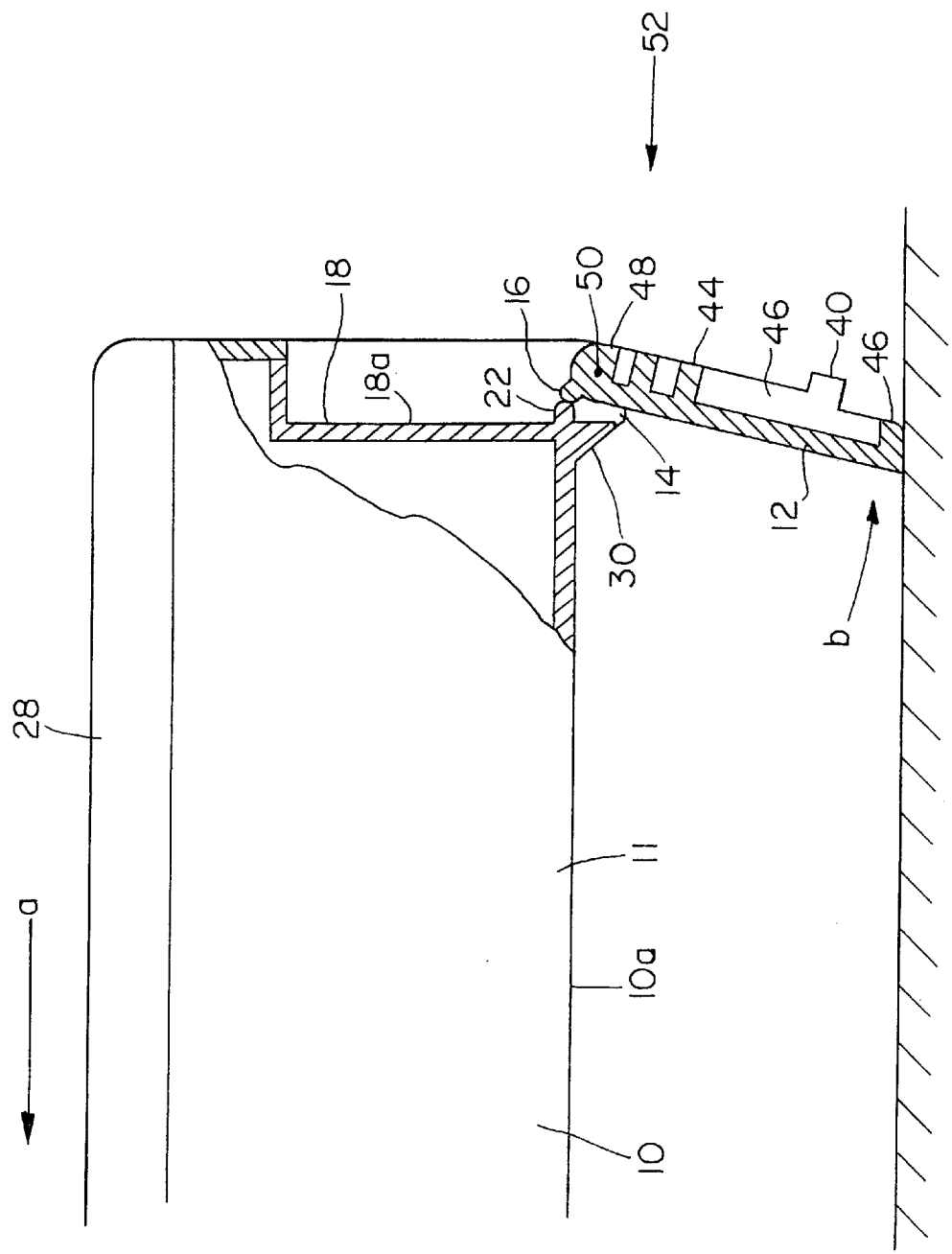
FIG. 4 is an enlarged side view of the invention port door and recessed port bay region in partial section showing the exterior port door and port bay protrusions engaged with each other in the notebook computer of FIG. 1.
Figure 5:
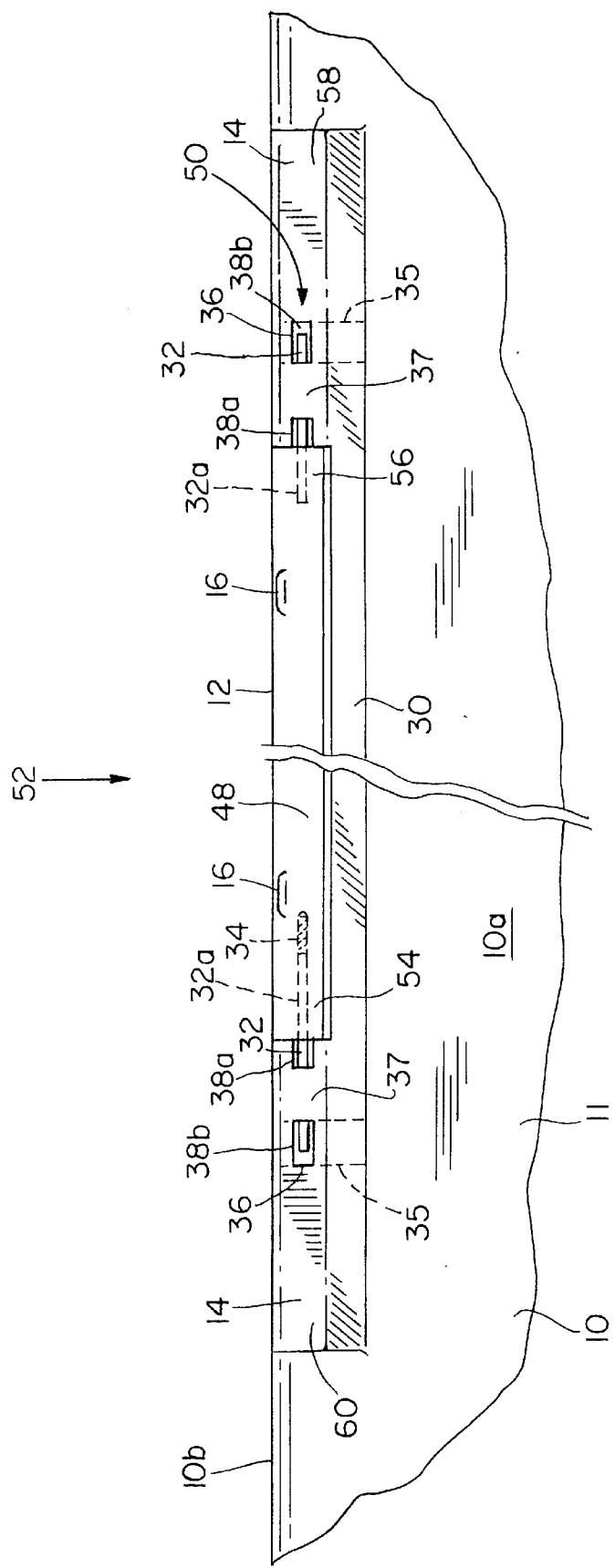
FIG. 5 is an enlarged bottom view of the rear of the notebook computer of FIG. 1 with the port door in the closed position.

Referring to FIG. 3, computer 10 is shown in position for use with screen 28 of computer 10 tilted backwardly for viewing purposes. Port door 12 is capable of being rotated from the closed position (as shown in FIG. 1) downwardly more than 180° to the position shown to form an acute angle β relative to the bottom surface 10a of base unit housing 11. In this position, the weight of computer 10 locks port door 12 against lip 30 of base unit housing 11 (FIGS. 4 and 5). Lip 30 is located along the junction of the rear wall 18a of port bay 18 and the bottom surface 10a of base unit housing 11 and protrudes downwardly. When port door 12 is locked in the downward position, port door 12 provides a foot for elevating the rear of computer 10 upwardly which tilts computer 10 at an angle θ so that the keyboard 26 of computer 10 is oriented in a more comfortable position for typing.

The reason that port door 12 is capable of being swung downwardly more than 180° to form an acute angle β with bottom surface 10a is because the hinge feet 14 extend downwardly from the bottom surface 10a of base unit 11 such that the hinge axis or pivot point 50 (FIG. 4) for port door 12 is located below the bottom surface 10a of base unit housing 11. If the hinge axis or pivot point 50 was above the bottom surface 10a, the port door 12 would be prevented from pivoting substantially more than 180° because the port door 12 would engage against lip 30. In other words, positioning hinge pivot point 50 below bottom surface 10a provides port door 12 with more room to rotate.

Referring to FIG. 4, if computer 10 is moved in the direction of arrow "a" while port door 12 is locked in the downward position for tilting computer 10, port door 12 will usually remain locked in position if computer 10 is moved over a smooth surface. However, if computer 10 is moved over a rough surface, port door 12 may begin to rotate in the direction of arrow "b". As port door 12 rotates, a pair of exterior port door protrusions 16 located on the outer surface of port door 12 at the bottom of the hinge portion 48 (also see FIGS. 1 and 5) on opposite ends of port door 12 engage the two port region protrusions 22. Engagement of protrusions 16 with protrusions 22 prevent port door 12 from rotating any further in the "b" direction, thereby preventing computer from collapsing out of the tilted position. Thus, protrusions 16 and 22 prevent accidental collapse of computer 10 from the tilted position which would damage computer 10. Referring to FIG. 5, the port door 12 is pivotably coupled to hinge feet 14 with two steel pins 32 along the hinge axis 50. The use of metallic pins 32 provides pivoting door system 52 with enough strength to be employed as a elevating foot. Port door 12 has a blind hole 32a within hinge portion 48 at each end 54/56 of port door 12. A pin 32 extends from each blind hole 32a and into a respective hinge foot 14. The pins 32 are trapped within hinge feet 14 between an outer wall 37 and an inner gusset 35. Hinge feet 14 include downwardly facing openings 38a and 38b which facilitate the insertion and removal of pins 32 from hinge feet 14 for assembly and disassembly. A compression spring 34 is positioned at the bottom of the hole 32a at end 54 of port door 12 for spring loading the pin 32. Spring loading one pin 32 allows port door 12 to be easily installed and removed. Alternatively, both pins 32 may be spring loaded. Pins 32 hold port door 12 in place with enough movement lateral to the hinge axis 50 to allow protrusions 16 to pass by protrusions 22 when port door 12 is initially swung into position for tilting computer 10 or when port door 12 is closed over port bay 18. Once port door 12 supports computer 10 in the tilted position, the weight of the computer 10 moves base unit housing 11 downwardly onto port door 12 so that protrusions 16 and 22 can engage if computer 10 is moved as described with respect to FIG. 4.

To install port door 12, a first pin 32 is inserted into the hinge foot 14 designated as 58 (FIG. 5). The hinge portion 48 of end 56 of port door 12 is moved close to the hinge foot 58 so that the pin 32 enters into the hole 32a within hinge portion 48. A compression spring 34 is inserted into the second hole 32a at the other end 54 of port door 12, and the second pin 32 is inserted into the second hole 32a after the spring 34. The second pin 32 is then pushed inwardly against spring 34 while the hinge portion 48 of end 54 of port door 12 is moved to be adjacent to the second hinge foot 14 designated as 60. The tip of the second pin 32 is then passed through the opening 38a in the second hinge foot 60 and released so that the spring 34 can extend the second pin 32 within the second hinge foot 60 thereby locking port door 12 between hinge feet 58/60. Openings 38b in hinge feet 14 allow the insertion of a tool into hinge feet 14 to depress spring loaded pins for removing port door 12.

In one preferred embodiment, port door 12 is about 5 inches long by about ⅞ inches high and about 3/16 inches thick at hinge portion 48. Notch 12a (FIGS. 1 and 2) is preferably about ¾ inches wide and about 0.08 inches high. When used as a foot for tilting computer 10 (as shown in FIG. 3), port door 12 preferably is swung downwardly and locked into position at an angle β of about 50° relative to bottom surface 10a. In this position, port door 12 typically tilts computer 10 at an angle θ of about 4°. Hinge feet 14 extend downwardly from the bottom surface 10a of base unit 11 about 0.09 inches and are about 3/16 inches wide and about 0.9 inches long. Pins 32 are about 0.04 inches in diameter and about 0.55 inches long. Spring 34 is about 0.04 inches in diameter and 0.3 inches long. Port bay protrusions 22 (FIGS. 2 and 4) are about 0.16 inches wide and protrude 0.06 inches from the rear wall 18a of port bay 18. The exterior port door protrusions 16 are about 0.11 inches wide and 0.03 inches high. Notches 24 (FIG. 2) in hinge portion 48 are about 0.23 inches wide and at least 0.06 inches deep. The interior port door tabs 40 (FIG. 2) are about 0.08 inches long and protrude from side edges 46 about 0.03 inches. Lip 30 (FIG. 4) extends downwardly from bottom surface 10a of base unit housing 11 about 0.06 inches. Although specific dimensions have been given above, such dimensions can vary depending upon the actual dimensions of computer 10.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, base unit housing 11 and port door 12 have been described to be made of plastic but, alternatively, can be made of other suitable materials such as magnesium by magnesium thixomolding. In addition, although the pivoting door system 52 has been shown and described as a port door for use with a notebook computer, it is understood that door system 52 is suitable for use with other portable computers such as with a tablet computer or for other types of doors. Furthermore, port door 12 can be pivotably secured with a single spring loaded steel pin extending completely through hinge portion 48. Two hinge foot 14 have been shown and described to be positioned beyond the ends of port door 12, but alternatively, one or two hinge feet can be positioned between the ends of the port door. In such a case, the port door would be shaped accordingly to accommodate the location of the hinge foot or feet.

What is claimed is:

1. A pivoting door system for a housing of a portable computer, the housing having a rear end and a bottom surface, the door system comprising:

a first housing hinge member extending downwardly from the housing below the bottom surface of the housing;

a door for covering a region at the rear end of the housing, the door being pivotably secured to the first housing hinge member about a hinge axis located below the bottom surface of the housing, the door being able to pivot downwardly to a position against the housing where the door is at an acute angle relative to the bottom surface of the housing to elevate the rear end of the housing, weight of the housing and computer locking the door in said position.

2. The door system of claim 1 in which the first housing hinge member is pivotably secured to the door with a first metallic pin.

3. The door system of claim 2 in which the first metallic pin is spring loaded with a spring.

4. The door system of claim 3 in which the first metallic pin pivotably secures a first end of the door to the first housing hinge member, the door system further comprising:

a second housing hinge member extending downwardly from the housing below the bottom surface of the housing and spaced apart from the first housing hinge member; and a second metallic pin for pivotably securing a second end of the door to the second housing hinge member.

5. The door system of claim 4 in which the spring is positioned within the first end of the door.

6. The door system of claim 5 in which the first housing hinge member includes an opening for providing access to the spring loaded pin.

7. The door system of claim 1 further comprising a housing protrusion extending from the rear end of the housing capable of engaging a recess in the door for removably securing the door.

8. The door system of claim 7 further comprising an exterior door protrusion extending from an exterior surface of the door capable of engaging with the housing protrusion for hindering rotation of the door towards a closed position when the door is in position to elevate the rear end of the housing.

9. The door system of claim 1 further comprising an interior door protrusion extending from an interior surface of the door capable of engaging an opening in the rear end of the housing for removably securing the door.

10. The door system of claim 1 in which the door covers a series of ports within a port bay recessed at the rear end of the housing.

11. A pivoting door system for a housing of a portable computer, the housing having a rear end and a bottom surface, the door system comprising:

a first housing hinge member extending downwardly from the housing below the bottom surface of the housing;

a door for covering a series of ports within a recessed port bay at the rear end of the housing, the door being pivotably secured to the first housing hinge member with a first metallic spring loaded pin about a hinge axis located below the bottom surface of the housing, the door being able to pivot downwardly to a position against the housing where the door is at an acute angle relative to the bottom surface of the housing to elevate the rear end of the housing, weight of the housing and computer locking the door in said position.

12. The door system of claim 11 in which the first metallic pin pivotably secures a first end of the door to the first housing hinge member, the door system further comprising:

a second housing hinge member extending downwardly from the housing below the bottom surface of the housing and spaced apart from the first housing hinge member; and a second metallic pin for pivotably securing a second end of the door to the second housing hinge member.

13. The door system of claim 12 in which the first housing hinge member includes an opening for providing access to the spring loaded pin.

14. The door system of claim 11 further comprising:

a housing protrusion extending from the rear end of the housing capable of engaging a recess in the door for removably securing the door; and an exterior door protrusion extending from an exterior surface of the door capable of engaging the housing protrusion for hindering rotation of the door towards a closed position when door is in position to elevate the rear end of the housing.

15. The door system of claim 11 further comprising an interior door protrusion extending from an interior surface of the door capable of engaging an opening in the rear end of the housing for removably securing the door.

16. A method of elevating a rear end of a housing for a portable computer, the housing including a bottom surface, the method comprising the steps of:

extending a first housing hinge member downwardly from the housing below the bottom surface of the housing;

pivotably securing a door to the first housing hinge member about a hinge axis located below the bottom surface of the housing, the door for covering a region at the rear end of the housing; and pivoting the door downwardly to a position against the housing where the door is at an acute angle relative to the bottom surface of the housing to elevate the rear end of the housing, weight of the housing and computer locking the door in said position.

17. The method of claim 16 further comprising the step of pivotably securing the first housing hinge member to the door with a first metallic pin, the first metallic pin being spring loaded.

18. The method of claim 17 in which the first metallic pin pivotably secures a first end of the door to the first housing hinge member, the method further comprising the steps of:

extending a second housing hinge member downwardly from the housing below the bottom surface of the housing and spaced apart from the first housing hinge member; and pivotably securing a second end of the door to the second housing hinge member with a second metallic pin.

19. The method of claim 18 further comprising the step of extending a housing protrusion from the rear end of the housing, the housing protrusion capable of engaging a recess in the door for removably securing the door.

20. The method of claim 19 further comprising the step of extending an exterior door protrusion from an exterior surface of the door, the exterior door protrusion capable of hindering rotation of the door towards a closed position when the door is in position to elevate the rear end of the housing.

* * * * *